United States Patent
Li et al.

(10) Patent No.: US 9,591,615 B2
(45) Date of Patent: Mar. 7, 2017

(54) DYNAMIC RESOURCE ALLOCATION BY BASE STATION PROVIDING BOTH BROADCAST AND UNICAST SERVICES

(71) Applicant: Telefonaktiebolaget L M Ericsson (publ), Stockholm (SE)

(72) Inventors: Weigang Li, Ottawa (CA); Jingdi Xu, Ottawa (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/380,381

(22) PCT Filed: Aug. 19, 2014

(86) PCT No.: PCT/IB2014/063969
§ 371 (c)(1),
(2) Date: Aug. 22, 2014

(87) PCT Pub. No.: WO2016/027126
PCT Pub. Date: Feb. 25, 2016

(65) Prior Publication Data
US 2016/0057732 A1  Feb. 25, 2016

(51) Int. Cl.
*H04W 72/00* (2009.01)
*H04W 24/02* (2009.01)
(Continued)

(52) U.S. Cl.
CPC ......... *H04W 72/005* (2013.01); *H04W 24/02* (2013.01); *H04W 36/08* (2013.01);
(Continued)

(58) Field of Classification Search
CPC ..... H04W 72/00; H04W 4/06; H04W 72/005; H04W 76/002; H04W 36/16;
(Continued)

(56) References Cited

U.S. PATENT DOCUMENTS 7,889,732 B2   2/2011   Bijwaard et al.
8,175,069 B2   5/2012   Wang et al.
(Continued)

FOREIGN PATENT DOCUMENTS

WO   2013182247 A1   12/2013

OTHER PUBLICATIONS

Qualcomm Research, "LTE eMBMS Technology Overview", Nov. 11, 2012, pp. 1-18, Qualcomm Incorporated, San Diego, US.
Ericsson, et al., "Clarification on frequency information in MBMSInterstindication message", 3GPP TSG-RAN WG2 #75bis, Zhuhai, China, Oct. 10, 2011, pp. 1-4, R2-115300.

*Primary Examiner* — Faruk Hamza
*Assistant Examiner* — Aixa Guadalupe
(74) *Attorney, Agent, or Firm* — Coats & Bennett, PLLC (57) ABSTRACT

A base station (10) dynamically allocates users among broadcast carriers and dynamically allocates carrier resources between broadcast and unicast service, based on the number of users actually receiving broadcast service on a carrier. The base station (10) periodically measures (204) the number of broadcast-only users registered to a carrier. As the number of such users decreases, the remaining idle broadcast-only are transferred (212) to other carriers transmitting the same broadcast content, and carrier resources are reallocated (208) to unicast service. When the carrier is moderately loaded, it may accept broadcast users transferred from other, lightly-loaded carriers, which are attempting to shed users to reallocate resources to unicast service. As the carrier becomes more heavily loaded, it will refuse (216) to accept transferred broadcast users. When the carrier's load reaches an upper threshold, the base station (10) allocates (220) resources of a new carrier to broadcast service, and moves users to the new carrier.

20 Claims, 6 Drawing Sheets (51) Int. Cl.
*H04W 36/08* (2009.01)
*H04W 4/06* (2009.01)
*H04W 76/00* (2009.01)
*H04W 24/08* (2009.01)
*H04W 72/04* (2009.01)
*H04W 36/22* (2009.01)

(52) U.S. Cl.
CPC .............. *H04W 4/06* (2013.01); *H04W 24/08* (2013.01); *H04W 36/22* (2013.01); *H04W 72/0473* (2013.01); *H04W 76/002* (2013.01)

(58) Field of Classification Search
CPC ........... H04W 36/0061; H04W 36/165; H04W 36/08; H04W 24/08; H04W 24/02; H04W 72/0473
See application file for complete search history.

(56) References Cited

U.S. PATENT DOCUMENTS

| | | |
|---|---|---|
| 2004/0131026 A1 | 7/2004 | Kim et al. |
| 2004/0162071 A1 | 8/2004 | Grilli et al. |
| 2008/0267109 A1* | 10/2008 | Wang .................. H04W 72/005 370/312 |
| 2010/0165902 A1 | 7/2010 | Kvernvik et al. |
| 2010/0329171 A1 | 12/2010 | Kuo et al. |
| 2013/0028118 A1* | 1/2013 | Cherian .............. H04W 72/005 370/252 |
| 2013/0183971 A1* | 7/2013 | Tamaki ............. H04W 36/0061 455/436 |
| 2014/0169258 A1 | 6/2014 | Futaki et al. |

* cited by examiner

DYNAMIC RESOURCE ALLOCATION BY BASE STATION PROVIDING BOTH BROADCAST AND UNICAST SERVICES

TECHNICAL FIELD

The present invention relates generally to wireless communication networks and, in particular, to dynamic resource allocation by a base station providing both broadcast and unicast services.

BACKGROUND

As wireless communication technology advances, two trends are clear: increasing numbers of users and a concomitant increased demand for capacity; and increasing sophistication and capabilities of User Equipment (UE), such as smartphones. To increase system capacity, multi-carrier solutions have become common. In multi-carrier systems (also known as carrier aggregation), a base station may provide wireless communication services to appropriately equipped UEs simultaneously on more than one carrier frequency.

One consequence of increasing UE sophistication, including large, high-resolution, color displays, is that users are increasingly choosing to view multimedia content (e.g., video programs with accompanying audio) on mobile UEs. Early solutions to this demand included Direct Video Broadcast (DVB) in Handheld (-H), Terrestrial (-T) and Satellite (-S) variants; MediaFLO; and Integrated Services Digital Broadcasting (ISDB-T). To address the demand for broadcast content in a system resource-efficient manner, making maximum use of the existing cellular infrastructure, Multimedia Broadcast Multicast Services (MBMS) was developed under the 3GPP framework for the Universal Mobile Telecommunications System (UMTS). MBMS is a specification for efficient point-to-multipoint delivery of multimedia content in 3GPP wireless communication networks. The Long Term Evolution (LTE) version is known as enhanced MBMS (eMBMS), or Multimedia Broadcast Single Frequency Network (MBSFN). MBMS type services are efficient because many UEs may be directed to tune to one carrier transmitting MBMS content rather than transmitting the multimedia content separately to each UE in a unicast (point-to-point) channel. Additionally, MBSFN allows a UE to increase signal gain by receiving the same broadcast signal from a plurality of transmitters.

In LTE, a base station may allocate time-frequency resources within each carrier—on a per-subframe basis—to either unicast or broadcast (eMBMS) service. Conventionally, this allocation is provisioned in advance, and is based on a network operators estimate of user interest in broadcast events (e.g., TV shows, sporting events, concerts, and the like). No mechanism is defined to facilitate the dynamic reallocation of downlink carrier subframes between unicast and broadcast functions. Accordingly, where the network operator's usage estimates are inaccurate, excess carrier resources may be dedicated to eMBMS transmissions, to which only a few UEs are subscribed, resulting in inefficient use of system resources.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments disclosed and claimed herein, a base station dynamically allocates users among broadcast carriers and dynamically allocates carrier resources between broadcast and unicast service, based on the number of users actually receiving broadcast service on a carrier. The base station periodically measures the number of broadcast-only users registered to a carrier. As the number of such users decreases, the remaining broadcast-only users are transferred to other carriers transmitting the same broadcast content. If the number of users falls below a threshold, and if another carrier is broadcasting the same content, the remaining users are moved to the other broadcast carrier and resources of the monitored carrier are reallocated to unicast service. When the carrier is moderately loaded, it may accept broadcast users transferred from other, lightly-loaded carriers, which are attempting to shed users to reallocate resources to unicast service. As the carrier becomes more heavily loaded, it will refuse to accept transferred broadcast users. When the carrier's load reaches an upper threshold, the base station allocates resources of a new carrier to broadcast service, and moves users to the new carrier.

One embodiment relates to a method of dynamic resource allocation by a base station operative in a wireless communication network providing both unicast and broadcast services. Resources of a first wireless carrier are allocated to broadcast first content. The number of users accessing the broadcast on the first carrier is monitored. If the number of users falls below a first predetermined threshold, the broadcast on the first carrier is terminated and the first carrier resources are allocated to unicast services.

Another embodiment relates to a base station operative in a wireless communication network providing both unicast and broadcast services. The base station includes: a wireless transceiver operative to communicate with a plurality of UE; memory operative to store one or more predetermined threshold values and a configurable time duration; and a controller operatively connected to the transceiver and the memory. The controller is operative to: allocate resources of a first wireless carrier to broadcast first content; monitor, at each iteration of the configurable time duration, the number of users accessing the broadcast on the first carrier; and, if the number of users falls below a first predetermined threshold, terminate the broadcast on the first carrier and allocate resources of the first carrier to unicast services.

Yet another embodiment relates to a computer-readable medium containing program instructions operative to cause a controller in a base station, operative in a wireless communication network providing both unicast and broadcast services, to dynamically allocate resources. The program instructions are operative to cause the controller to allocate resources of a first wireless carrier to broadcast first content and monitor the number of users accessing the broadcast on the first carrier. If the number of users falls below a first predetermined threshold, the program instructions are operative to cause the controller to terminate the broadcast on the first carrier and allocate resources of the first carrier to unicast services. If the number of users is above the first threshold and below a second predetermined threshold higher than the first threshold, the program instructions are operative to cause the controller to move the users to a second carrier broadcasting the first content. If the number of users is above a third predetermined threshold higher than the second threshold, the program instructions are operative to cause the controller to refuse to accept users transferred from other carriers broadcasting the first content. If the number of users is above a fourth predetermined threshold higher than the third threshold, the program instructions are operative to cause the controller to allocate resources of a third carrier to broadcast the first content.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. In particular, embodiments of the present invention are described with respect to eMBMS in a 3GPP LTE environment. However, the invention is not limited to this technology. Those of skill in the art may readily implement the embodiments disclosed herein to other network technologies and/or protocols—e.g., utilizing logical channels, handover procedures, and the like appropriate for a given technology/protocol—as required or desired, given the teaching of the present disclosure.

Figure 1:
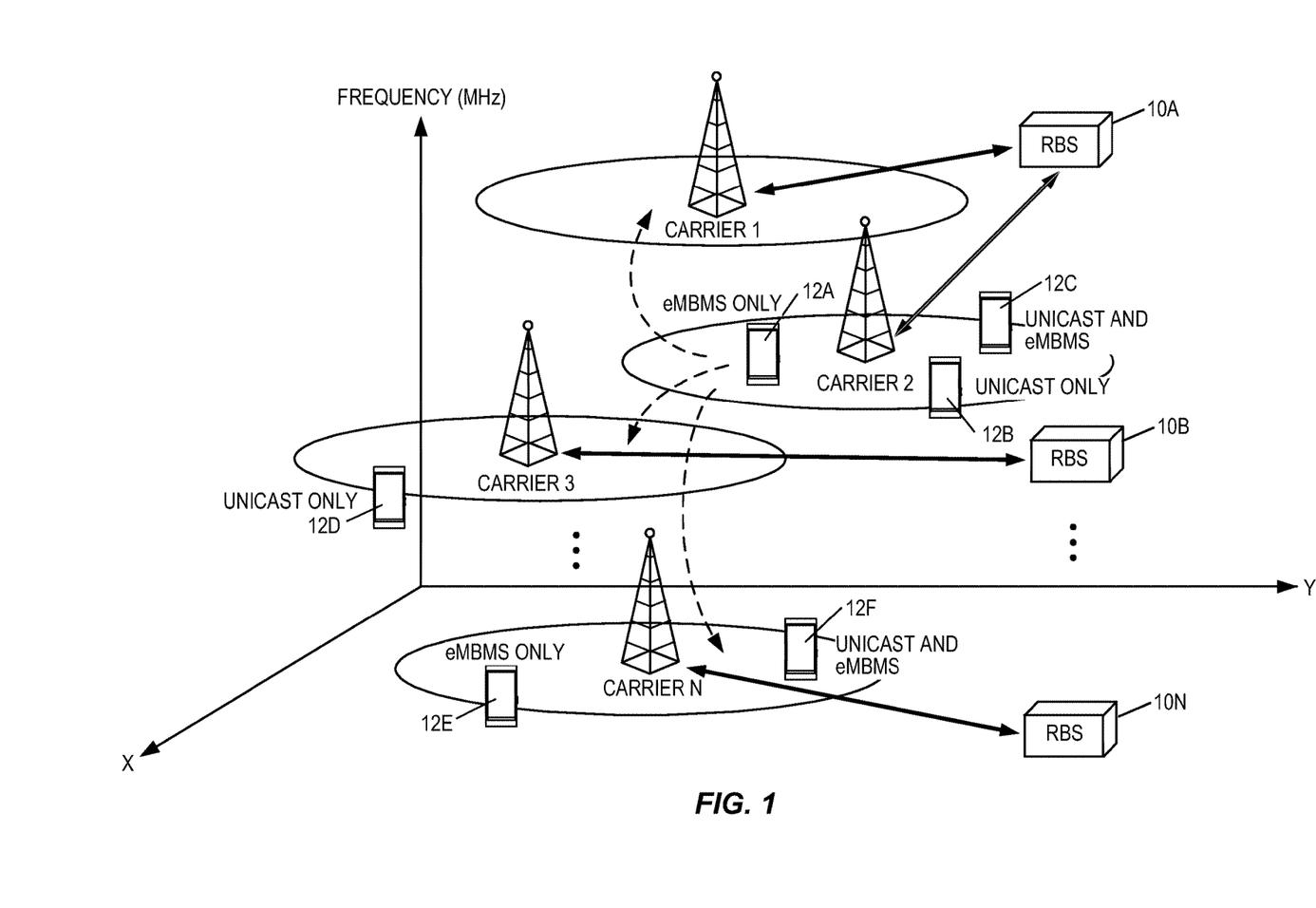
FIG. 1 is a three-dimensional block diagram of a wireless communication network having overlapping carriers.

FIG. 1 depicts a three-dimensional view of overlapping LTE carriers (also known in the art as cells) in a representative wireless communication network. Geographic location is indicated with reference to the x- and y-axes, and the frequency axis indicates wireless spectrum allocation.

In the network 10 of FIG. 1, a plurality of Radio Base Stations (RBS) 10a, 10b, . . . , 10n, have one or more downlink carriers, denoted Carrier1, Carrier2, Carrier3, . . . , CarrierN. In this example, RBS 10a controls two carriers (Carrier1 and Carrier2), and RBSs 10b and 10n each has one carrier. For example, RBS 10a, may comprise a primary, or macro, base station providing wireless communication service to subscribers over a geographic area, also known in LTE as a Node B or eNode B (eNB). RBS 10a may have carriers Carrier1 and Carrier2 from separate antennas, as shown. Alternatively, Carrier1 and Carrier2 may be transmitted on different frequencies from the same antenna (or antenna site, e.g. tower), and have substantially overlapping coverage. RBS 10b may comprise a lower-power base station providing limited service over a small area, such as a stadium, mall, or the like, known as a picocell. RBS 10n may comprise a still lower-power base station providing service to a more limited area, such as a home, business, airplane, or the like, known as a femtocell. In general, all the RBSs 10a, 10b, . . . , 10n may comprise any mix of base station size, power, and coverage area, as may be deployed by a wireless system operator. In the LTE network 10, all the carriers are capable of transmitting both broadcast and unicast services, in accordance with the applicable 3GPP protocols.

FIG. 1 depicts a plurality of User Equipment (UE) 12a-12f (referred to generally by the number 12). Receiving service on Carrier2, transmitted by RBS 10a, are UE 12a which receives only eMBMS content; UE 12b which receives only unicast service (i.e., voice call, email downlink, web browsing, or the like); and UE 12c which receives both eMBMS and unicast services. Similarly, UE 12d receives only unicast service from Carrier3, transmitted by RBS 10b. Finally, UE12e receives only eMBMS service on CarrierN from RBS 10n; and UE 12f receives both eMBMS and unicast service on CarrierN. No UE 12 is shown receiving any service on Carrier1. Accordingly, in this example, RBS 10a has the option of terminating transmission of Carrier1 to save power and reduce interference. UEs 12a and 12e receive only eMBMS service. These are referred to herein as idle mode UEs 12, or idle eMBMS users, since they are allocated no unicast service physical resources (that is, they are in idle mode with respect to unicast service).

As shown in FIG. 1 by the x-y grid, UE 12a is located in a geographic position such that it may receive service from any of the carriers. That is, although the UE 12a is registered with Carrier2, it receives all carrier signals with sufficient signal strength that it may register with (or be handed off to) any of Carrier1, Carrier3, or CarrierN, as indicated by the dashed lines. Even if UE 12a remains registered on Carrier2, it may improve its reception of eMBMS content by receiving the same content from multiple carriers.

Figure 2:
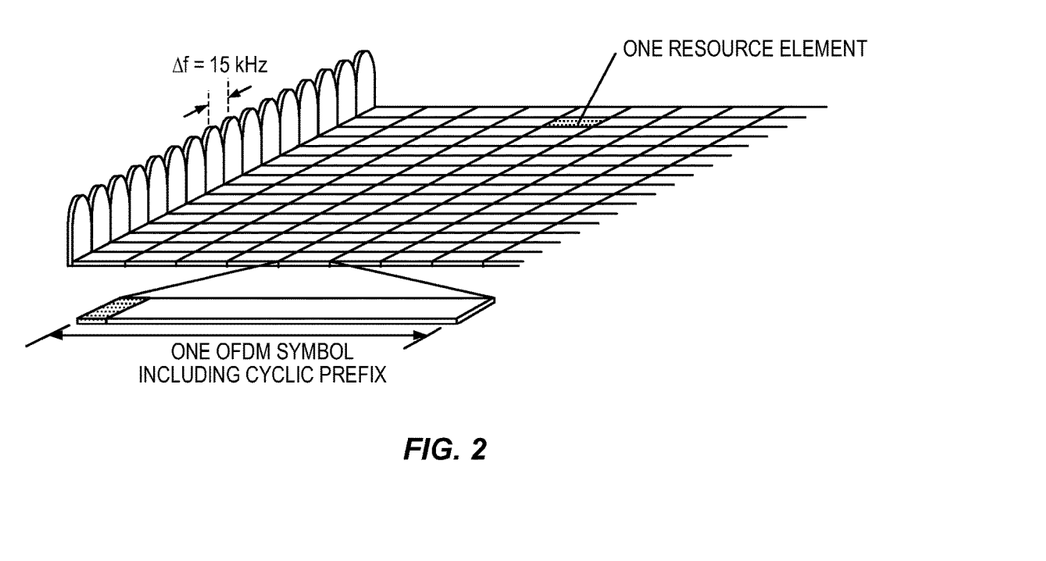
FIG. 2 is a time-frequency diagram of an OFDM carrier.

LTE uses Orthogonal Frequency Division Multiplex (OFDM) modulation in the downlink (and DFT-spread OFDM in the uplink). The basic LTE physical resource for each carrier can thus be seen as a time-frequency grid as illustrated in FIG. 2. Each resource element corresponds to one OFDM subcarrier (15 KHz) during one OFDM symbol interval. Individual resource elements may be allocated, for example, for reference (pilot) signal transmission. Resource allocation, such as for unicast service, is typically described in terms of resource blocks (RB), where a resource block corresponds to one slot (0.5 ms) in the time domain and 12 contiguous subcarriers in the frequency domain.

Figure 3:
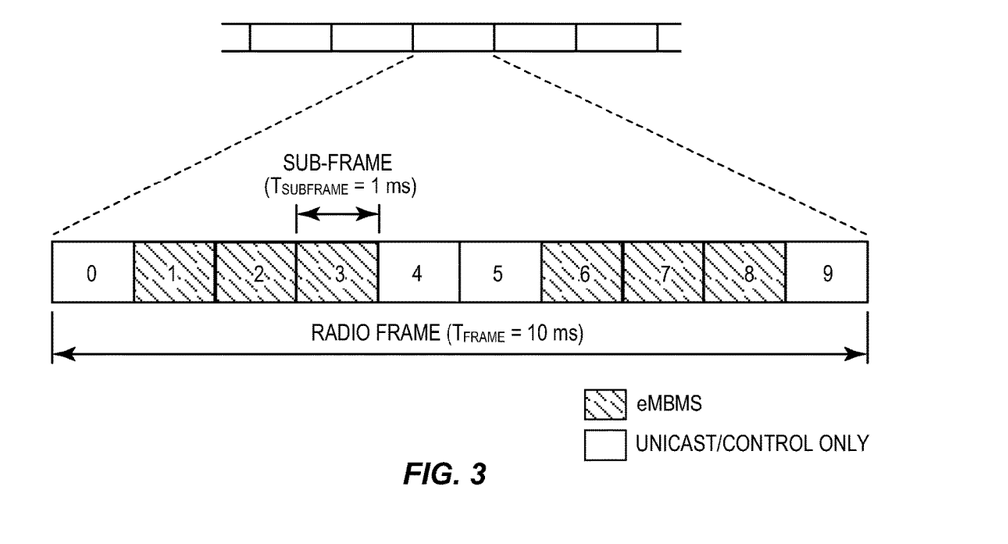
FIG. 3 is a time domain graph of an LTE frame structure.

FIG. 3 depict a time domain view of LTE transmissions, which are organized into radio frames of 10 ms. Each radio frame consists of ten equally-sized subframes of length $T_{subframe}=1$ ms, numbered 0-9. Each subframe comprises two equally-sized slots of length $T_{slot}=0.5$ ms. Aside from control information, each subframe may only transmit either unicast data or eMBMS content. In particular, in an FDD implementation, as depicted in FIG. 3, eMBMS transmissions are limited to subframes 1, 2, 3, 6, 7, and 8; subframes 0, 4, 5, and 9 are reserved for unicast services and control channels (eMBMS is limited to subframes 3, 4, 7, 8, and 9 in TDD implementations).

Thus, a maximum of 60% of the downlink resources of any carrier may be dedicated to eMBMS transmissions, with the rest reserved for unicast services, as well as synch, paging, and other control functions. The number of subframes allocated to eMBMS service depends on the broadcast content (e.g., the amount of services, broadcast quality video or high-definition video). This parameter is set at service initiation, and does not change for the duration of an eMBMS broadcast session. The amount of downlink channel resources (i.e., number of subframes) allocated to eMBMS service is independent of the number of UEs 12 registered to that channel. Accordingly, having only a few UEs 12 receiving a broadcast, which may utilize a plurality of subframes, represents a highly inefficient allocation of resources. As one extreme example, consider a single eMBMS UE 12 registered to a carrier broadcasting high-definition video content that requires the allocation of five subframes—this would result in ~50% of the downlink carrier capacity being dedicated to a single user.

According to embodiments of the present invention, a base station 10 periodically monitors the number of idle mode UEs 12 subscribed to eMBMS service on a carrier. In the event that only a few idle mode UEs 12 are registered to a carrier, overall system efficiency is enhanced by moving the few idle UEs 12 to a different carrier broadcasting the same content (assuming one is available), and reallocating the erstwhile eMBMS carrier resources to unicast service.

According to various embodiments described herein, the base station 10 periodically monitors the number of idle UEs 12 subscribing to eMBMS on a channel, and compares the number to various predetermined threshold values. The periodicity of this monitoring is predefined, and, in one embodiment, is configurable. As the carrier load—a measure of the number of idle UEs 12—crosses the thresholds, various system resource allocation actions are taken, such as: transferring idle UEs 12 to other carriers; accepting (or refusing) idle UEs 12 from other, lightly-loaded carriers; reallocating carrier resources from broadcast to unicast service, and activating service on a new carrier (or a new eMBMS activation on an active carrier). Because these actions occur in response to the instantaneous count of idle UEs 12 receiving eMBMS service on a carrier, the resource management actions are dynamic and real-time and result in optimal use of network resources. For example, reallocating carrier resources from broadcast to unicast service may lower the transmission power of the base station 10. This reduces RF interference between carriers, reduces power consumption, and reduces the RF radiation into the environment.

The base station 10 may monitor the number of idle eMBMS UEs 12 in a number of ways. Initially, when each UE 12 registers to receive the broadcast content, the base station 10 assigns the UE 12 to a carrier. In at least some implementations, when a UE 12 decides to stop receiving broadcast content and leave the broadcast group, it sends a cancellation message to the base station, which updates the UE 12 context. The base station 10 may thus maintain a list (or at least a count) of idle eMBMS UEs 12 that it has assigned to a particular carrier. The base station 10 is thus aware of the number of idle eMBMS UEs 12 receiving service on any carrier at any time.

The base station 10 periodically compares the number of idle UEs 12 on a given carrier to a plurality of pre-configured threshold values. In the following discussion, these thresholds are assigned names suggestive of their function; however, these are merely labels and are not limitations of the present invention. The thresholds are listed below from lowest to highest:

turn_off: When the number of idle eMBMS users meets this lowest threshold and another carrier is broadcasting the same content, the base station 10 will disable eMBMS service on the current carrier, and reallocate eMBMS resources (i.e., subframes) of the carrier to unicast service. The turn_off threshold may be larger than zero users. However, in one embodiment, once the threshold is triggered, the base station 10 must transfer any remaining idle UEs 12 to another carrier prior to terminating the broadcast service.

start_move_out: When the number of idle eMBMS users equals or falls below this threshold (which is higher than the turn_off threshold), the base station 10 will begin moving idle eMBMS users out of the current carrier to an another available carrier that is accessible by the relevant UE 12 and that is broadcasting the same content. Note that the target carrier may comprise a carrier transmitted from the same base station 10 (e.g., in FIG. 1, moving UE 12a from Carrier2 to Carrier1). Alternatively, the target carrier may comprise a carrier transmitted by a neighboring (or underlying) base station 10, for which the relevant UE 12 has adequate reception (e.g., moving UE 12a to Carrier3). The mechanism for moving the idle eMBMS users may be the well-known handover procedure, or any other procedure defined in a protocol.

stop_move_in: When the number of idle eMBMS users on a given carrier first reaches this threshold (which is much higher than the start_move_out threshold), it means that the number of idle eMBMS users on the carrier is large—indeed, the number of users is near the maximum capacity of the carrier. In this case, the base station 10 stops receiving transfers of idle eMBMS users from other carriers (i.e., lightly-loaded carriers, the number of idle eMBMS users of which have met or fallen below their own start_move_out threshold). Note that between the start_move_out and stop_move_in thresholds, the base station 10 may accept, for the given carrier, new idle eMBMS users from different carriers which are lightly loaded and wish to shed users so resources of those carriers can be reallocated to unicast service. Below the start_move_out and above the stop_move_in thresholds, the carrier will not accept idle eMBMS users from other carriers—in the former case because it is attempting to shed its own few idle eMBMS users and, in the latter case, because it is too heavily loaded.

high_usage: When the number of idle eMBMS users on a given carrier first meets this threshold (which is higher than the stop_move_in threshold), it means that the number of idle eMBMS users on the carrier is at or very near its maximum capacity. This threshold triggers the base station 10 to allocate resources of an available carrier to broadcast service. The base station 10 will then move idle eMBMS users from the highly loaded carrier to the newly allocated carrier. In one embodiment, the base station 10 continues moving idle eMBMS users to the new carrier until the load on the first carrier reaches the stop_move_in threshold.

Figure 4:
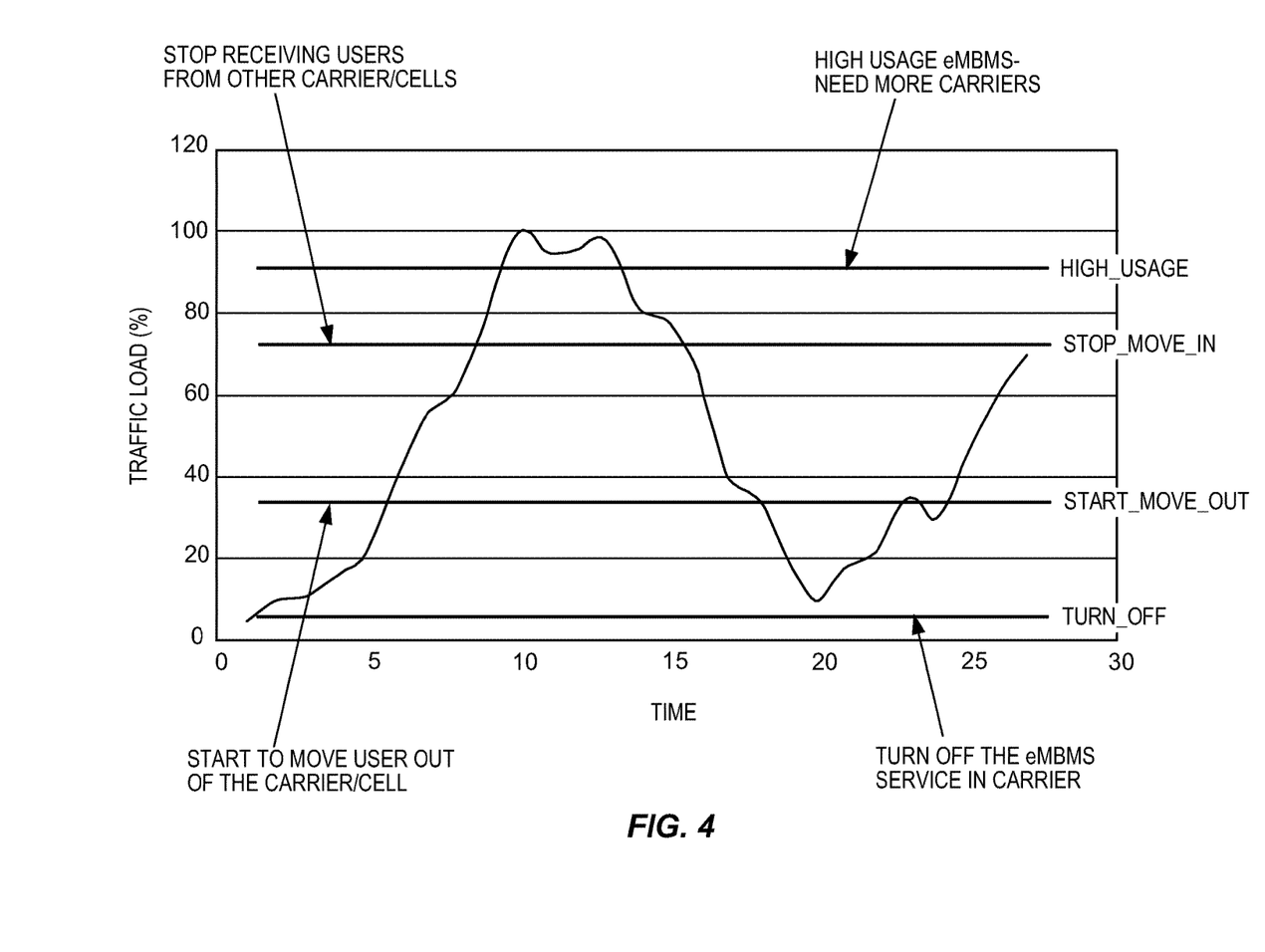
FIG. 4 is a graph depicting dynamic traffic load at a base station over time.

FIG. 4 is a graph depicting the load on a representative carrier—that is, the number of eMBMS users as a percentage of the capacity of the carrier—over time. Initially, after resources of a carrier are allocated to broadcast service at time t=0, the load increases as UEs 12 register with the carrier, such as at or near the start time of broadcast content, such as a scheduled movie or an event such as a sports game. Initially—i.e., the first six minutes—the increased load is exclusively the result of new UE 12 registrations. After the load crosses the start_move_out threshold at t=6, the base station 10 continues to accept new UE 12 registrations, and, additionally, may accept handovers of idle UEs 12 from other, lightly-loaded carriers. The load on the carrier rapidly increases until it crosses the stop_move_in threshold at t=8. At this point, the base station 10 refuses to accept new idle UEs 12 from other carriers. However, the load continues to rise due to new eMBMS users registering with the base station 10.

When the load crosses the high_usage threshold at t=10, the base station 10 allocates resources of a new carrier to broadcast service, transmitting the same content as the original carrier. The base station 10 will register new UEs 12 with the newly allocated carrier, and may additionally move some idle eMBMS users from the overloaded carrier to the newly allocated carrier. In one embodiment, the base station 10 moves idle eMBMS users from the source to the target carrier until the load on the source carrier falls to or below the stop_move_in threshold.

As the load on the broadcast carrier 18 decreases, it again passes the stop_move_in threshold at t=16, and the base station 10 will again take new idle eMBMS users from other carriers, and assign them to this carrier. However, the load continues to decrease, passing the start_move_out threshold at t=18. At this point, the carrier is too lightly loaded to justify the allocation of resources to eMBMS service, and the base station 10 begins to move idle eMBMS users to other carriers broadcasting the same content. The load rapidly drops to a minimum at t=20. At this point, the load is still above the turn_off threshold. Accordingly, the base station 10 maintains the carrier in operation.

If the load had dropped below the turn_off threshold at this point, if another carrier was broadcasting the same content, the base station 10 would turn off the eMBMS service, and would have reallocated the carrier's resource (i.e., subframes) to unicast service. Note that, in this example, the turn_off threshold is slightly above zero utilization. In one embodiment, the base station 10 would have to transfer the remaining idle eMBMS users to another carrier prior to reallocating the carrier resources from broadcast to unicast service. However, in the case depicted in FIG. 4, the base station 10 maintains the allocation of carrier resources to broadcast service, and new UEs 12 requesting eMBMS service are assigned to the carrier.

New UEs 12 continue to register and are assigned to the carrier. At t=24, the load is again above the start_move_out threshold, and the base station 10 will accept idle eMBMS users from other, lightly-loaded carriers and assign them to this carrier.

In this manner, the base station 10 dynamically allocates idle eMBMS users among carriers, and furthermore dynamically allocates carrier resources between broadcast and multicast services, all in response to the actual user load on the carriers. This allows the base station 10 to achieve optimal resource allocation, even in the face of erroneous predictions about broadcast service utilization.

Figure 5:
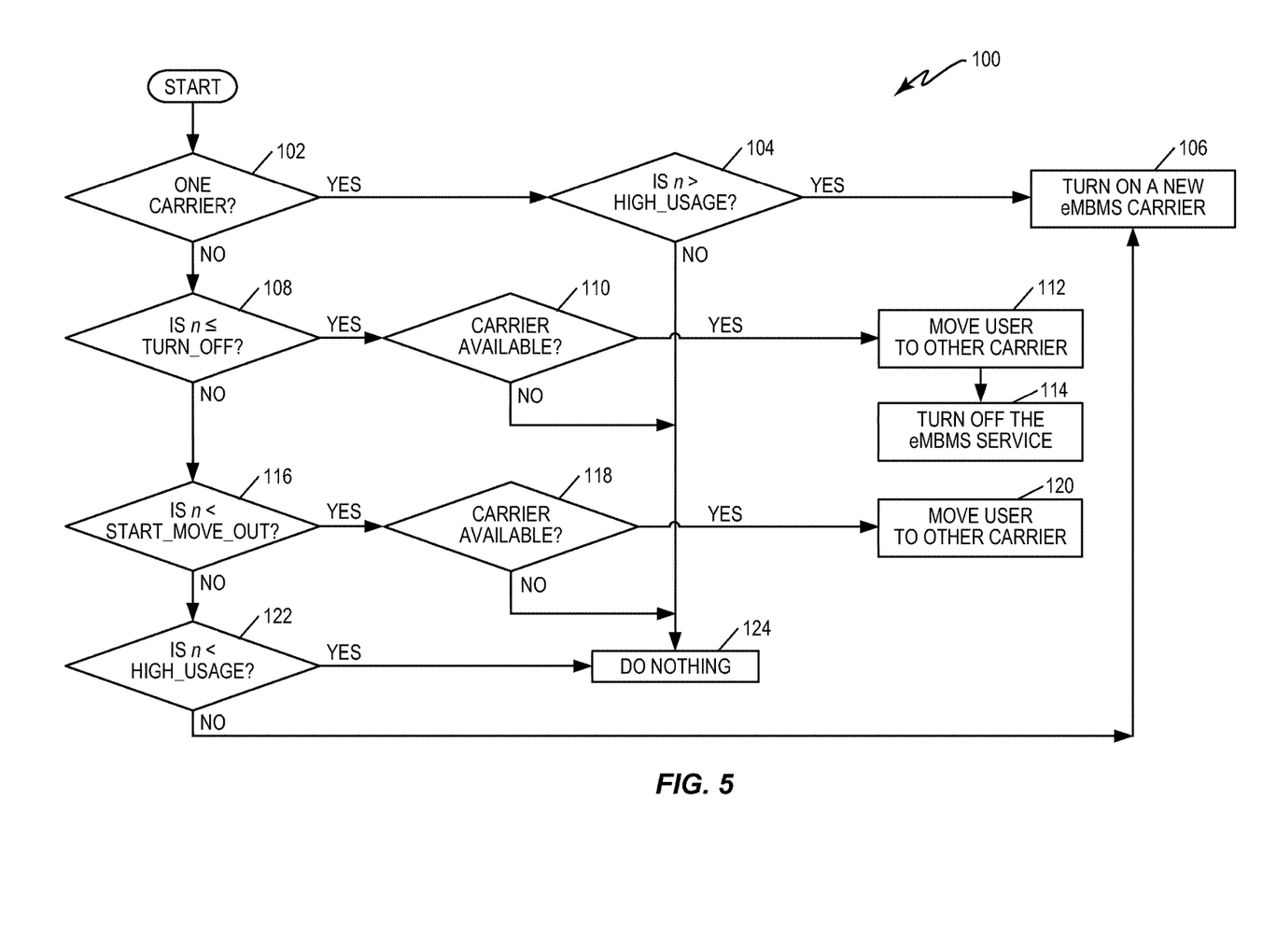
FIG. 5 is a flow diagram of a method of managing base station resources.

FIG. 5 depicts a method 100 of managing base station 10 resources when one or more broadcast service (e.g., eMBMS) is to be provided. The base station 10 periodically collects eMBMS user statistics—particularly the number n of current, idle eMBMS users—and compares them with the predefined thresholds discussed above.

When only one carrier has resources allocated to broadcast service (block 102), the number of eMBMS users n is checked against the high_usage threshold (block 104). If n>high_usage (block 104), resources of a new carrier are allocated to broadcast service (block 106), and idle eMBMS users are transferred from the overloaded carrier to the newly allocated carrier until, in one embodiment, the load n on the original carrier falls to the stop_move_in threshold. Otherwise (block 104), the base station 10 takes no action regarding the allocation of resources of the carrier (block 124) and waits for the next user measurement event.

If more than one carrier is available (block 102), the base station 10 determines whether n_turn_off (block 108). If so, the base station 10 ascertains whether another carrier is available, transmitting the same content and accessible by UEs 12 (block 110). Note that the alternate carrier may be transmitted from the same base station 10 or it may be a carrier transmitted from a neighboring or underling base station 10. In either case (and if the UEs 12 can access the carrier in the event it is from a different base station 10), the base station 10 moves the remaining idle eMBMS users from the underloaded carrier to the alternate carrier(s) (block 112). The base station 10 then terminates eMBMS service on the underloaded carrier (block 114) and reallocates the carrier resources to unicast service. In the event an appropriate alternative carrier is not available (block 110), the base station 10 takes no action regarding the underloaded carrier (block 124) and waits for the next user measurement event.

If n>turn_off (block 108), the base station then compares n to the start_move_out threshold. If turn_off<n<start_move_out (block 116), the base station 10 checks for an appropriate alternate carrier (block 118), as described above. If one or more are available—that is, if the number of users on an appropriate target carrier is less than the value of the stop_move_in threshold on the target carrier—the base station 10 moves at least some idle eMBMS users to the alternate carrier (block 120). Otherwise (block 118), the base station 10 takes no action regarding the underloaded carrier (block 124) and waits for the next user measurement event.

If the number of eMBMS users is above start_move_out (block 116) but less than the high_usage threshold (block 122), the base station 10 takes no action regarding moving eMBMS users out or reallocating carrier resources (block 124). Note that if start_move_out<n<stop_move_in, the base station 10 will accept idle eMBMS users from another lightly-loaded carrier, which is shedding users to reallocate its carrier resources to unicast service. However, if stop_move_in<n<high_usage, the base station 10 will not accept such transferred idle eMBMS users, as it is too heavily loaded. If n high_usage (block 122), the base station 10 allocates resources to eMBMS service on a new carrier and transfers idle eMBMS users to the new carrier until, in one embodiment, the carrier loading falls below the stop_move_in threshold value.

Figure 6:
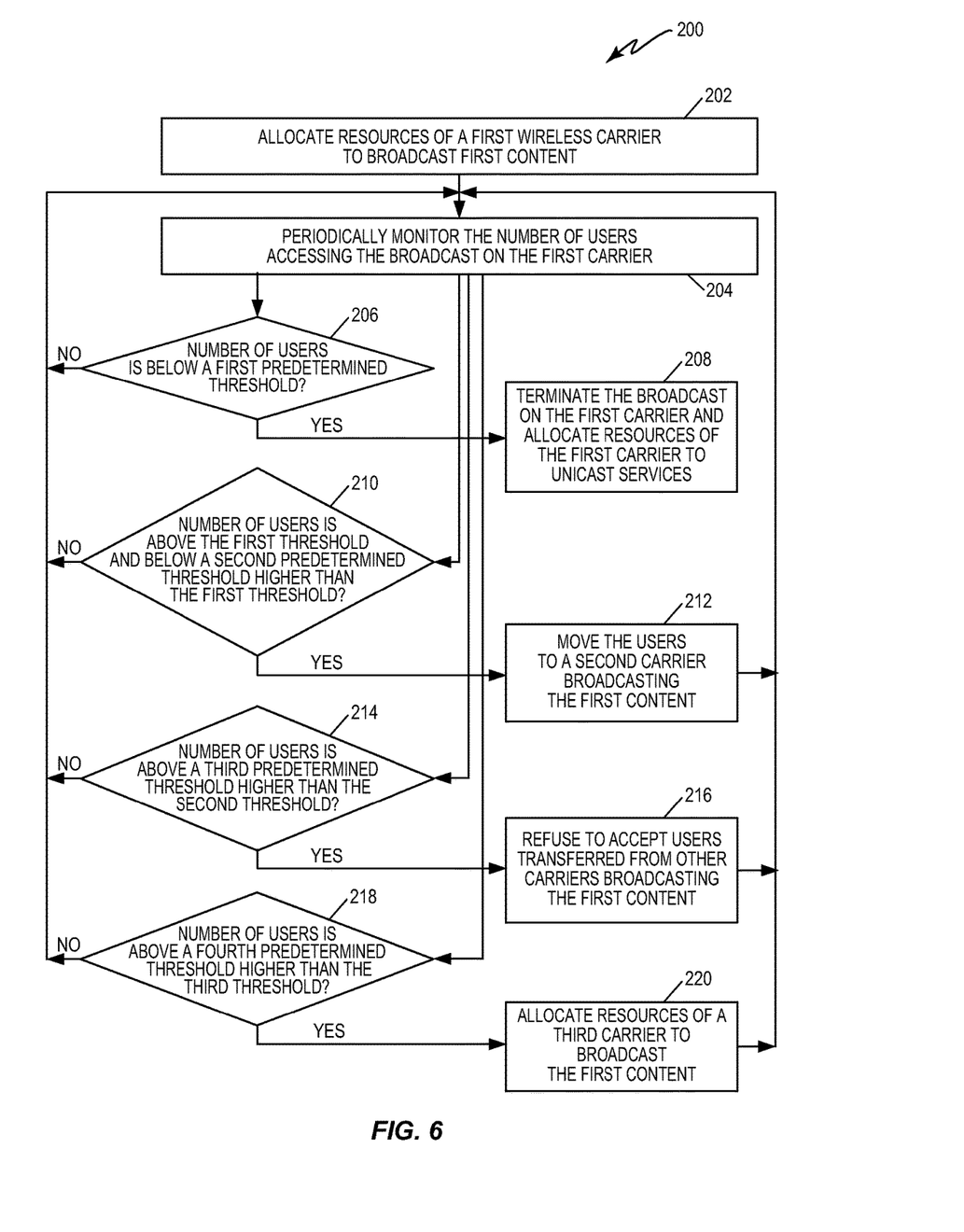
FIG. 6 is a flow diagram of a method of dynamic resource allocation by a base station.

FIG. 6 depicts a method 200 of dynamic resource allocation by a base station 10 operative in a wireless communication network providing both unicast and broadcast services. The method 200 is similar to the method 100 described above. Initially, resources of a first wireless carrier are allocated to broadcast first content (e.g., via eMBMS) (block 202). The base station 10 periodically monitors the number of users accessing the broadcast on the first carrier (block 204). At each instance of obtaining an updated number of users, the number is compared to one or more thresholds. As indicated by flow lines leaving block 204 in parallel, the threshold comparisons may be performed simultaneously, or sequentially in any order. Furthermore, not every threshold need necessarily be compared at each iteration.

If the number of users is below a first predetermined threshold (block 206), for example, the turn_off threshold described above, the base station 10 terminates the broadcast on the first carrier and reallocates broadcast resources of the first carrier to unicast services (block 208). In one embodiment, prior to terminating the broadcast, the base station 10 transfers any remaining users registered to receive broadcast service on the first carrier to a second carrier broadcasting the first content. In one embodiment, resources of the first carrier are not reallocated to unicast service unless and until all such users have been transferred.

If the number of users is above the first threshold below and below a second predetermined threshold higher than the first threshold (block 210), for example, above the turn_off threshold and below the start_move_out threshold described above, the base station 10 moves users registered to receive broadcast service on the first carrier to a second carrier broadcasting the first content (block 212). The second carrier may comprise a carrier transmitted by the base station 10, or it may comprise a carrier transmitted by a neighboring or underlying base station. The base station 10 may move users to the second carrier via standard handover procedures. The users moved may be only idle mode users who receive a broadcast service but are not allocated any physical layer resources.

If the number of users is above a third predetermined threshold higher than the second threshold (block 214), such as for example, above the stop_move_in threshold described above, the base station 10 refuses to accept attempted transfers of users from other carriers broadcasting the first content, to the first carrier (block 216).

If the number of users is above a fourth predetermined threshold higher than the third threshold (block 218), for example, above the high-usage threshold described above, the base station 10 allocates resources of a third carrier to broadcast the first content (block 220). The base station 10 may additionally move users from the first carrier to the third carrier, in one embodiment, until the number of users on the first carrier falls below the third threshold.

At each iteration of threshold comparison and possible idle broadcast user movement or carrier resource (re)allocation, the method 200 returns to block 204, where the number of users accessing broadcast content on the first carrier is ascertained. The periodicity of this method step is configurable. A base station 10 may be provisioned with a duration to wait between assessments of the number n of idle broadcast users. Alternatively, the base station 10 may be dynamically updated to increase or decrease this wait duration. In one embodiment, the periodicity of idle broadcast user monitoring may itself be a dynamic quantity, varying, for example, with the number n of such users, the rate of change of n with respect to time, or other factors. Note that block 208 terminates the method 200 by terminating broadcast service on a particular carrier. If broadcast service were to be resumed on that carrier, the method 200 would begin anew at block 202.

Figure 7:
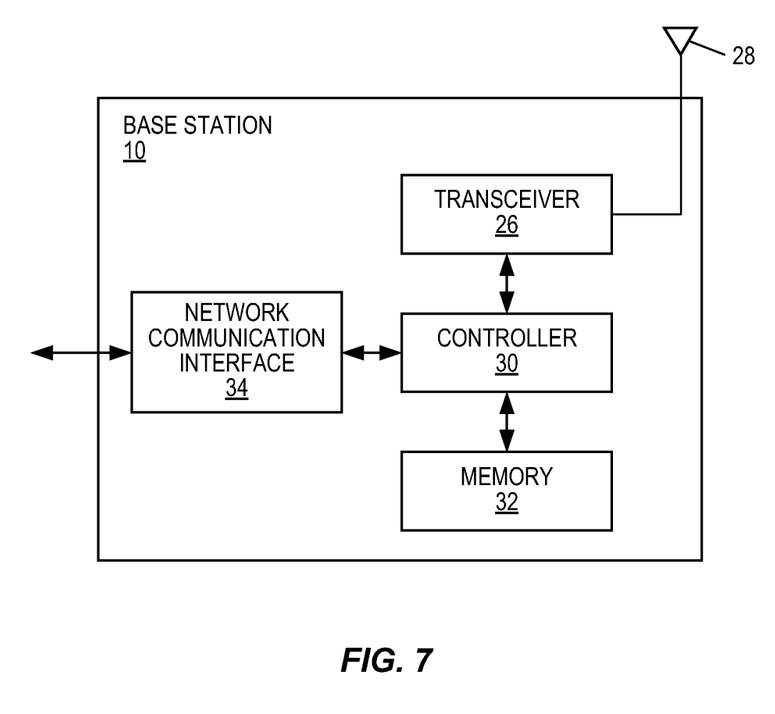
FIG. 7 is a functional block diagram of a base station.

FIG. 7 is a functional block diagram of a base station 10. As used herein, a base station 10 is a radio access network device operative to provide wireless communication services to a plurality of UEs 12 across an air interface. In particular, the base station 10 is operative to provide both unicast and broadcast services. The base station 10 may be known, according to various wireless network standards, as a Radio Base Station (RBS), a Base Station Transceiver (BTS), a Radio Network Controller (RNC), a Node B, or an enhanced Node B (eNode B, or eNB). The base station 10 comprises a transceiver 26 operatively connected to one or more antenna 28; a network communication interface 34; and a controller 30 operatively connected to memory 32.

The transceiver 26 is operative to effect wireless (e.g., RF) communication with a plurality of UEs 12 within a service area. The transceiver 26, under the control of the controller 30, implements a Radio Access Network (RAN) according to one or more communication protocols known in the art or that may be developed, such as IEEE 802.xx, CDMA, WCDMA, GSM, LTE, UTRAN, WiMax, or the like. The transceiver 26 implements transmitter and receiver functionality appropriate to the RAN links (e.g., (de)coding, (de)spreading, (de)modulation, amplification, and the like). The transmitter and receiver functions may share circuit components and/or software, or alternatively may be implemented separately.

The network communication interface 34 may comprise a receiver and transmitter interface used to communicate with one or more other network nodes, such as other base stations, as well as core network nodes (not depicted for simplicity but well known to those of skill in the art). The network communication interface 34 is operative to send and receive messages and data over a communication network according to one or more communication protocols known in the art or that may be developed, such as Ethernet, TCP/IP, SIP, SONET, ATM, or the like. The network communication interface 34 implements receiver and transmitter functionality appropriate to the communication network links (e.g., optical, electrical, wireless, and the like). The transmitter and receiver functions may share circuit components and/or software, or, alternatively, may be implemented separately.

The controller 30 may comprise any sequential state machine operative to execute machine instructions stored as machine-readable computer programs in the memory, such as: one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination thereof.

The memory 32 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. The memory is operative to store at least one or more predetermined threshold values and a configurable time duration. The memory is further operative to store computer programs operative to cause the controller 30 to implement the inventive methods 100, 200 described and claimed herein.

The dynamic movement of idle mode broadcast users, and concomitant carrier resource allocation described and claimed herein presents numerous advantages over the prior art. The methods 100, 200 are dynamic and automated—that is, they balance idle broadcast users between downlink carriers automatically and in real time, based on actual usage. The methods 100, 200 thus approach optimal resource allocation, even in the face of wildly inaccurate network operator predictions of broadcast participation. By terminating broadcast service on lightly-loaded carriers and reallocating the carrier resources to unicast service, system capacity is increased and overall transmission power is reduced. This reduces RF interference to other wireless communications and reduces the RF energy output into the environment.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of dynamic resource allocation by a base station operative in a wireless communication network providing both unicast and broadcast services, comprising:
    allocating resources of a first wireless carrier to broadcast first content;
    monitoring a number of users accessing the broadcast on the first carrier; and
    if the number of users falls below a first predetermined threshold and a second carrier is broadcasting the first content,
        transferring the users to the second carrier broadcasting the first content, and
        reallocating the broadcast resources of the first carrier to unicast services.

2. The method of claim 1 further comprising:
    if the number of users is above the first threshold and below a second predetermined threshold higher than the first threshold, moving at least some users from the first carrier to the second carrier broadcasting the first content.

3. The method of claim 2 wherein the users moved to the second carrier are idle mode broadcast users, which have not been allocated physical layer resources for unicast services.

4. The method of claim 2 wherein the second carrier is transmitted by a same base station as the first carrier.

5. The method of claim 2 wherein the second carrier is transmitted by a different base station than the first carrier, and wherein moving at least some users from the first carrier to the second carrier broadcasting the first content comprises initiating a handover procedure to move the users to the second carrier.

6. The method of claim 2 further comprising:
    if the number of users is above a third predetermined threshold higher than the second threshold, refusing to accept users onto the first carrier transferred from other carriers broadcasting the first content.

7. The method of claim 6 further comprising:
    if the number of users is above a fourth predetermined threshold higher than the third threshold, allocating resources of a third carrier to broadcast the first content.

8. The method of claim 7 further comprising moving users from the first carrier to the third carrier until the number of users on the first carrier falls below the third threshold.

9. The method of claim 1 further comprising:
    assessing unicast carrier usage; and
    reducing transmit power from a broadcast transmit power level, in response to the unicast carrier usage.

10. The method of claim 1 wherein monitoring the number of users accessing the broadcast on the first carrier comprises iteratively monitoring the number of users at configurable time intervals and comparing the number of users to one or more predetermined thresholds at each iteration.

11. A base station operative in a wireless communication network providing both unicast and broadcast services, comprising:
    a wireless transceiver operative to communicate with a plurality of User Equipments;
    memory operative to store one or more predetermined threshold values and a configurable time duration; and
    a controller operatively connected to the transceiver and the memory and operative to allocate resources of a first wireless carrier to broadcast a first content;
        monitor, at each iteration of the configurable time duration, a number of users accessing the broadcast on the first carrier; and
        if the number of users falls below a first predetermined threshold and there is a second carrier broadcasting the first content,
            transfer the users to the second carrier broadcasting the first content, and reallocate the broadcast resources of the first carrier to unicast services.

12. The base station of claim 11 wherein the controller is further operative to:
    if the number of users is above the first threshold and below a second predetermined threshold higher than the first threshold, move at least some users from the first carrier to the second carrier broadcasting the first content.

13. The base station of claim 12 wherein the users moved to the second carrier are idle mode broadcast users, which have not been allocated physical layer resources for unicast service.

14. The base station of claim 12 wherein the second carrier is transmitted by a same base station as the first carrier.

15. The base station of claim 12 wherein the second carrier is transmitted by a different base station than the first carrier, and wherein the controller is operative to move at least some users from the first carrier to the second carrier broadcasting the first content by initiating a handover procedure to move the users to the second carrier.

16. The base station of claim 12 wherein the controller is further operative to:
    if the number of users is above a third predetermined threshold higher than the second threshold, refuse to accept users onto the first carrier transferred from other carriers broadcasting the first content.

17. The base station of claim 16 wherein the controller is further operative to:
    if the number of users is above a fourth predetermined threshold higher than the third threshold, allocate resources of a third carrier to broadcast the first content.

18. The base station of claim 17 wherein the controller is further operative to move users from the first carrier to the third carrier until the number of users on the first carrier falls below the third threshold.

19. The base station of claim 11 wherein the controller is further operative to:
    assess unicast carrier usage; and control the transceiver to reduce transmit power from a broadcast transmit power level, in response to the unicast carrier usage.

20. A non-transitory computer-readable medium containing program instruction operative to cause a controller in a base station, operative in a wireless communication network providing both unicast and broadcast services, to dynamically allocate resources by:
   allocating resources of a first wireless carrier to broadcast first content;
   monitoring the number of users accessing the broadcast on the first carrier; and
   if the number of users falls below a first predetermined threshold, reallocating broadcast resources of the first carrier to unicast services;
   if the number of users is above the first threshold and below a second predetermined threshold higher than the first threshold, moving at least some users from the first carrier to a second carrier broadcasting the first content;
   if the number of users is above a third predetermined threshold higher than the second threshold, refusing to accept users onto the first carrier, transferred from other carriers broadcasting the first content; and
   if the number of users is above a fourth predetermined threshold higher than the third threshold, allocating resources of a third carrier to broadcast the first content.

* * * * *